United States Patent
Cullen et al.

(10) Patent No.: US 7,072,129 B1
(45) Date of Patent: Jul. 4, 2006

(54) IDENTIFYING DEFECTIVE DATA SECTORS IN A DISK DRIVE

(75) Inventors: Michael J. Cullen, Discovery Bay, CA (US); Carl R. Messenger, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/882,473

(22) Filed: Jun. 30, 2004

(51) Int. Cl.
*G11B 27/36* (2006.01)
*G11B 5/09* (2006.01)
*G01R 31/28* (2006.01)

(52) U.S. Cl. ............................ 360/31; 360/53; 714/719

(58) Field of Classification Search ................... 360/31
See application file for complete search history.

(56) References Cited

U.S. PATENT DOCUMENTS

| | | | |
|---|---|---|---|
| 6,223,303 B1 | | 4/2001 | Billings et al. |
| 6,327,106 B1 | * | 12/2001 | Rothberg ..................... 360/53 |
| 6,408,406 B1 | * | 6/2002 | Parris ........................... 714/41 |
| 6,600,614 B1 | * | 7/2003 | Lenny et al. .................. 360/31 |
| 6,625,777 B1 | * | 9/2003 | Levin et al. ................. 714/774 |
| 6,647,517 B1 | * | 11/2003 | Dickey et al. ................ 714/48 |
| 6,731,442 B1 | * | 5/2004 | Jin et al. ....................... 360/31 |

* cited by examiner

*Primary Examiner*—Wayne Young
*Assistant Examiner*—Daniell L. Negrón
(74) *Attorney, Agent, or Firm*—Jason T. Evans, Esq.; Robroy R. Fawcett, Esq.

(57) ABSTRACT

A method for identifying defective data sectors in a disk drive comprising generating a test pattern on a portion of a disk surface; reading the test pattern on the portion to detect an error and if an error is detected: associating the error with a physical location on the portion to identify a defective area unsuitable for user data; and assigning a severity category to the defective area. The method further comprises providing a physical defect list (P-list) for listing each defective area, the P-list having a predetermined limit to restrict a number of P-list entries; and posting the defective areas having a first severity category to the P-list and if the P-list limit is not exceeded by the first severity category entries: posting defective areas having a second severity category to the P-list.

24 Claims, 2 Drawing Sheets

IDENTIFYING DEFECTIVE DATA SECTORS IN A DISK DRIVE

FIELD OF THE INVENTION

This invention relates to data sectors in a disk drive. More particularly, the present invention is directed to a method for identifying defective data sectors in a disk drive.

BACKGROUND OF THE INVENTION

Disk drives are commonly used to store large amounts of data in a readily available form. Typically, the primary components of a disk drive are a head disk assembly and a printed circuit board assembly (PCBA) which, when fixed to one another, form a functional unit that is then connected to a computer.

The steady demand for larger capacity drives has resulted in a multifold increase in the data storage capacity of each disk in a disk drive. This increase in capacity, however, has caused a corresponding increase in the process time to perform the multiple scan passes required for defect detection and management. This increase in the cycle time to find all the major and minor defects has in turn increased the cost of production of the disk and that of the overall disk drive.

Currently, one approach to reduce the cycle time is to reduce the number of scan passes used to detect defects. This approach, however, increases the risk of missing some of the latent defects that may later surface due to environmental stress when the disk drive ultimately becomes operational.

Accordingly, what is needed is a more effective method for reducing the cycle time associated with detecting defects in a disk drive.

SUMMARY OF THE INVENTION

This invention can be regarded as a method for identifying defective data sectors in a disk drive. The method comprises generating a test pattern on a portion of a disk surface; reading the test pattern on the portion to detect an error and if an error is detected: associating the error with a physical location on the portion to identify a defective area unsuitable for user data; and assigning a severity category to the defective area.

The method further comprises providing a physical defect list (P-list) for listing each defective area, the P-list having a predetermined limit to restrict a number of P-list entries; and posting the defective areas having a first severity category to the P-list and if the P-list limit is not exceeded by the first severity category entries: posting defective areas having a second severity category to the P-list.

DETAILED DESCRIPTION OF THE INVENTION

Figure 1:
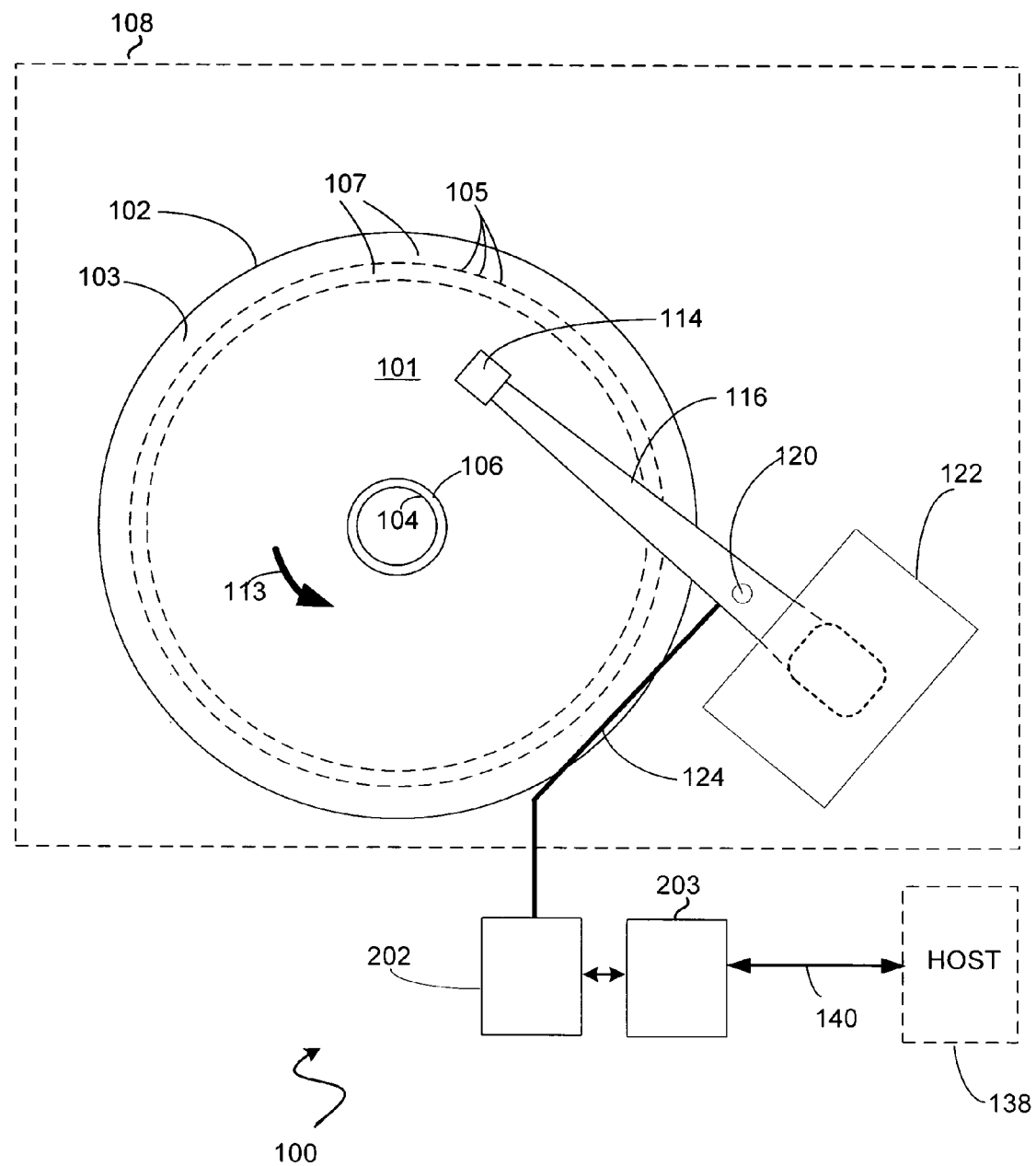
FIG. 1 illustrates an exemplary hard disk drive in which the present invention may be practiced.

With reference to FIG. 1, an exemplary hard disk-drive 100 is shown in which the present invention may be practiced. As shown, the hard disk drive 100 includes a head disk assembly (HDA) 108 having one or more disks 102 with a magnetic media 101 having a plurality of tracks 107 each with a plurality of data sectors 105, formed on each surface 103 of a disk 102. The HDA 108 further comprises a head 114 mounted on a rotary actuator 116 that rotates about a pivot 120 via controlled torques applied by a voice coil motor (VCM) 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 108 to a control system 202 which can control the movement of the actuator 116 for moving the actuator 116 to position the head 114 over a track 107. In addition, the servo control system 202 sends to and receives signals from the head 114 during read and write operations performed on the disk 102. As also shown in FIG. 1, the servo control system 202 is interconnected to the interface control system 203 which is in turn interconnected to a host computer 138 by a bus 140 for transferring of data between the hard disk drive 100 and the host 138.

Figure 2:
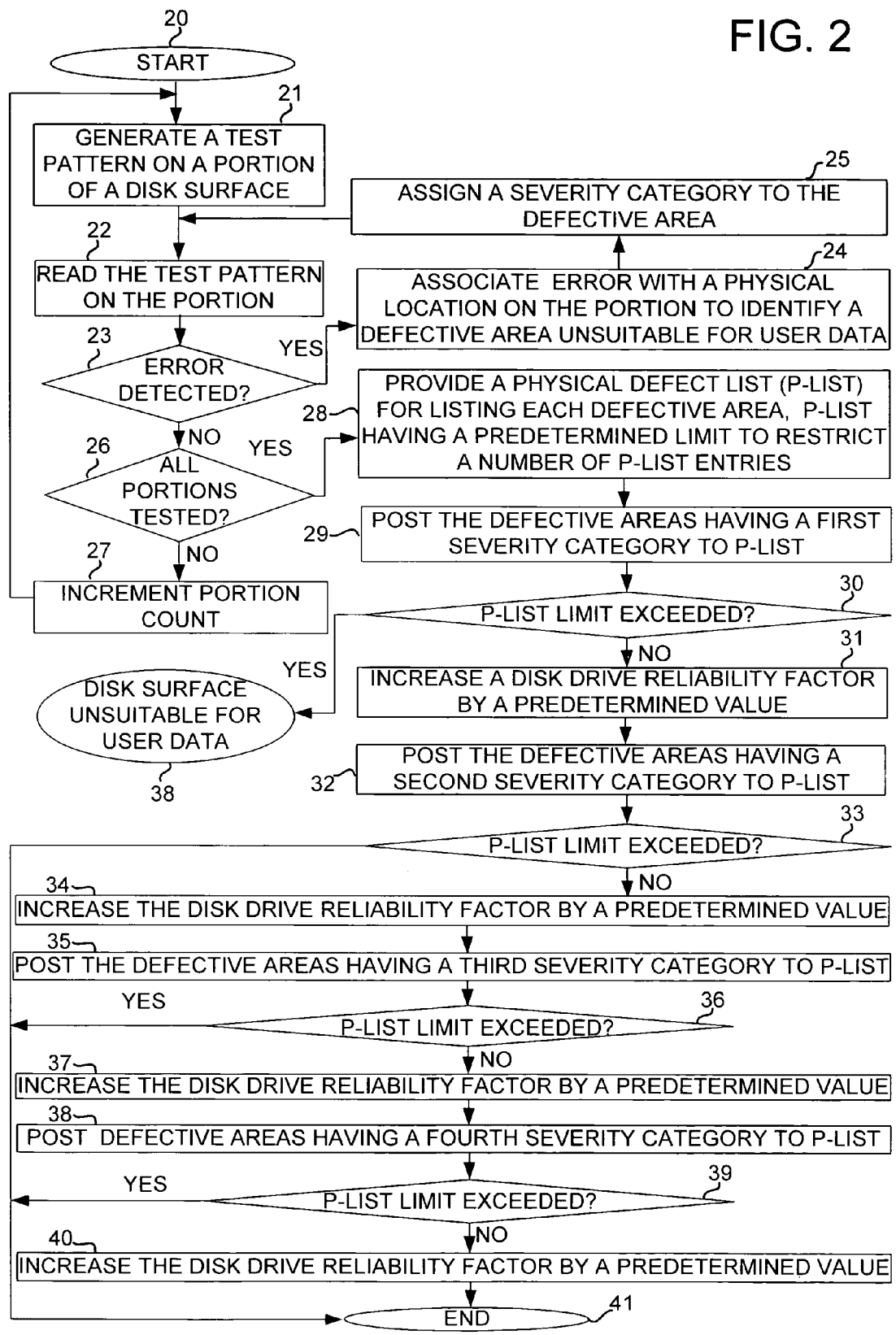
FIG. 2 is a flow chart illustrating a process used in an embodiment of the present invention.

FIG. 2 is a flow chart illustrating the method of the present invention for identifying defective data sectors in the disk drive 100. As shown the process begins in block 20 and proceeds to block 21 in which a test pattern is generated on a portion of a disk surface 103. Suitably the portion of a disk surface 103 is a data sector (or sectors) 105 of a track (or tracks) 107. The process then flows to block 22 in which the generated test pattern is read on the portion to detect an error. Next, if in decision block 23 it is determined that an error is detected, the flow then proceeds to block 24 wherein the detected error is associated with a physical location on the portion to identify a defective area unsuitable for user data. In this context, the term "unsuitable" means that the defective area exhibits data error, or a likelihood that data error may occur during subsequent operation of the disk drive 100. Next, the flow proceeds to block 25 in which a severity category, such as a first, second, third or fourth category, is assigned to the defective area. The flow is then returned to block 21 for a continued reading of the test pattern on the portion.

Returning to decision block 23, if no error is detected, then the flow proceeds to decision block 26 in which it is determined if all (or a pre-selected subset of all) portions on the disk surface 103 have been scanned for defects. If not, then the flow proceeds to block 27 in which a portion count is incremented, signifying a selection of a different portion and the flow is returned to block 21 for repeating of process blocks 21–23 for the different selected portion.

If in decision block 26 it is determined that all (or a pre-selected subset of all) portions on the disk surface 103 have been tested via the above-described single scan, then the flow proceeds to block 28 in which a physical defect list (P-list) is provided for listing each of the previously identified defective areas (in block 24) and its corresponding assigned category (in block 25). The P-list has a predetermined limit to restrict a number of P-list entries. Suitably, the P-list limit comprises a predetermined percentage of data sectors 105 of the disk surface 103, such as those within the area defined by line 106. In one exemplary embodiment, the predetermined percentage is 0.04 percent. In another exemplary embodiment the predetermined percentage is in the range of 0.01 to 1 percent. Suitably, the P-list limit comprises a predetermined number of data sectors of the disk surface, such as 18,000 data sectors.

Next, in block 29, the defective areas having a first severity category are posted to the P-list. Suitably, the first severity category corresponds to unrecoverable data sector defects. Next, in decision block 30, if it is determined that the P-list limit has been exceeded by the first severity category entries, then the flow proceeds to block 38 in which the disk surface 103 is declared unsuitable for user data. If in decision block 30 it is determined that the P-list limit has not been exceeded by the first severity category entries, then the flow proceeds to block 31 in which a disk drive reliability factor is increased by a predetermined value. Next, in block 32 defective areas having a second severity category are posted to the P-list. Suitably, the second severity category corresponds to a defect category that includes (but is not limited to): a) error correction code (ECC) on-the-fly defects; 2) scratch-fill defects; and 3) channel margin defects, arising from for example a narrowing of the margin in a read channel for acceptable errors, such as by modifying the gain threshold for a sector from high to low; a changing of cut off frequencies, low frequency gain, high frequency gains etc.

Next, in decision block 33, if it is determined that the P-list limit has been exceeded by the second severity category entries, then the flow proceeds to block 41 in which the overall process ends. If in decision block 33 it is determined that the P-list limit has not been exceeded by the second severity category entries, then the flow proceeds to block 34 in which the disk drive reliability factor is increased by a predetermined value. Next, in block 35, the defective areas having a third severity category corresponds to a defect category that includes (but is not limited to): a) error correction code (ECC) on-the-fly defects; 2) scratch-fill defects; and 3) channel margin defects, arising from for example a narrowing of the margin in a read channel for acceptable errors, such as by modifying the gain threshold for a sector from high to low; a changing of cut off frequencies, low frequency gain, high frequency gains etc.

Next, in decision block 36, if it is determined that the P-list limit has been exceeded by the third severity category entries, then the flow proceeds to block 41 in which the overall process ends. If in decision block 36 it is determined that the P-list limit has not been exceeded by the third severity category entries, then the flow proceeds to block 37 in which the disk drive reliability factor is increased by a predetermined value. Next, in block 38, the defective areas having a fourth severity category are posted to the P-list. Suitably, the fourth severity category corresponds a defect in a category corresponds to a defect category that includes (but is not limited to): a) error correction code (ECC) on-the-fly defects; 2) scratch-fill defects; and 3) channel margin defects, arising from for example a narrowing of the margin in a read channel for acceptable errors, such as by modifying the gain threshold for a sector from high to low; a changing of cut off frequencies, low frequency gain, high frequency gains etc.

Next, in decision block 39, if it is determined that the P-list limit has been exceeded by the fourth severity category entries, then the flow proceeds to block 41 in which the overall process ends. If in decision block 39 it is determined that the P-list limit has not been exceeded by the third severity category entries, then the flow proceeds to block 40 in which the disk drive reliability factor is increased by a predetermined value. The flow then proceeds to block 41 in which the overall process ends.

One advantage of the foregoing feature of the present invention over the prior art is that by using a single scan to identify all the defective data sectors of a disk surface, the overall associated cycle time can be reduced without increasing the risk of missing some of the latent defects that may later surface when the disk drive ultimately becomes operational.

It should be noted that the process of the present invention is not limited to the foregoing exemplary categories and any number of categories having varying characteristics can be used and are contemplated to be within the scope of the present invention. It also should be noted that the various features of the foregoing embodiments were discussed separately for clarity of description only and they can be incorporated in whole or in part into a single embodiment of the invention having all or some of these features.

What is claimed is:

1. A method for identifying defective data sectors in a disk drive, the method comprising:
   generating a test pattern on a portion of a disk surface;
   reading the test pattern on the portion to detect an error and if an error is detected:
      associating the error with a physical location on the portion to identify a defective area unsuitable for user data;
      assigning a severity category to the defective area;
   providing a physical defect list (P-list) for listing each defective area, the P-list having a predetermined P-list limit to restrict a number of P-list entries; and
   posting the defective areas having a first severity category to the P-list and if the P-list limit is not exceeded by the first severity category entries after all of the defective areas having the first severity category on the portion are posted to the P-list, then:
      posting defective areas having a second severity category to the P-list.

2. The method of claim 1, wherein the portion in a disk surface is a data sector of a track.

3. The method of claim 1, wherein the portion in a disk surface is a plurality of data sectors of a track.

4. The method of claim 1, wherein the portion in a disk surface is a plurality of data sectors of a plurality of tracks.

5. The method of claim 1, wherein the first severity category corresponds to unrecoverable data sector defects.

6. The method of claim 5, wherein the disk surface is declared unusable if the first severity category entries posted to the P-list exceed the P-list limit.

7. The method of claim 1, wherein the P-list limit comprises a predetermined percentage of data sectors of the disk surface.

8. The method of claim 7, wherein the predetermined percentage is 0.04 percent.

9. The method of claim 7, wherein the predetermined percentage is in the range of 0.01 to 1 percent.

10. The method of claim 7, wherein the P-list limit comprises a predetermined number of data sectors of the disk surface.

11. The method of claim 1, wherein the second severity category corresponds to error correction code (ECC) on-the-fly defects.

12. The method of claim 1, wherein the second severity category corresponds to scratch-fill defects.

13. The method of claim 1, wherein the second severity category corresponds to channel margin defects.

14. The method of claim 1, further comprising:
   increasing a disk drive reliability factor by a predetermined value if the P-list limit is not exceeded by the first severity category entries.

15. The method of claim 1, further comprising:

posting defective areas having a third severity category to the P-list if the P-list limit is not exceeded by the second severity category entries.

16. The method of claim 15, wherein the third severity category corresponds to error correction code (ECC) on-the-fly defects.

17. The method of claim 15, wherein the third severity category corresponds to scratch-fill defects.

18. The method of claim 15, wherein the third severity category corresponds to channel margin defects.

19. The method of claim 15, further comprising:

increasing a disk drive reliability factor by a predetermined value if the P-list limit is not exceeded by the third severity category entries.

20. The method of claim 15, further comprising:

posting defective areas having a fourth severity category to the P-list if the P-list limit is not exceeded by the third severity category entries.

21. The method of claim 20, wherein the fourth severity category corresponds to error correction code (ECC) on-the-fly defects.

22. The method of claim 20, wherein the fourth severity category corresponds to scratch-fill defects.

23. The method of claim 20, wherein the fourth severity category corresponds to channel margin defects.

24. The method of claim 20, further comprising:

increasing the disk drive reliability factor by a predetermined value if the P-list limit is not exceeded by the fourth severity category entries.

* * * * *